US009379476B2

(12) United States Patent
Tanaka et al.

(10) Patent No.: US 9,379,476 B2
(45) Date of Patent: Jun. 28, 2016

(54) CONNECTOR

(71) Applicant: Yazaki Corporation, Minato-ku, Tokyo (JP)

(72) Inventors: Masahiro Tanaka, Kakegawa (JP); Hajime Kato, Kakegawa (JP); Madoka Ohishi, Makinohara (JP); Sotaro Kato, Makinohara (JP); Takaaki Miyajima, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 99 days.

(21) Appl. No.: 14/301,494

(22) Filed: Jun. 11, 2014

(65) Prior Publication Data

US 2014/0295709 A1 Oct. 2, 2014

Related U.S. Application Data

(63) Continuation of application No. PCT/JP2012/084282, filed on Dec. 26, 2012.

(30) Foreign Application Priority Data

Dec. 27, 2011 (JP) ................................ 2011-286391

(51) Int. Cl.
*H01R 13/58* (2006.01)
*H01R 13/516* (2006.01)
(Continued)

(52) U.S. Cl.
CPC ........ *H01R 13/516* (2013.01); *B29C 45/14467* (2013.01); *B29C 45/14639* (2013.01);
(Continued)

(58) Field of Classification Search
CPC ............... H01R 43/24; H01R 13/5845; H01R 13/5205; H01R 13/504; H01R 13/405

USPC .......................... 439/604, 606, 736, 874, 875
See application file for complete search history.

(56) References Cited

U.S. PATENT DOCUMENTS 5,100,347 A * 3/1992 Malasky, III ....... H01R 13/5205
439/604
5,964,622 A * 10/1999 Ishikawa ............. B29C 45/1671
439/606

(Continued)

FOREIGN PATENT DOCUMENTS

JP 2533907 Y2 4/1997
JP 2002-208456 A 7/2002
JP 2006-229090 A 8/2006

OTHER PUBLICATIONS

International Search Report dated Mar. 27, 2013 issued in International Application No. PCT/JP2012/084282 (PCT/ISA/210).
(Continued)

*Primary Examiner* — Hien Vu
(74) *Attorney, Agent, or Firm* — Sughrue Mion, PLLC

(57) ABSTRACT

A connector includes a plurality of metal terminal fittings connected to terminals of electric wires, a plurality of molded housings molded to connection parts of the electric wires and the metal terminal fittings to cover the connection parts, and an overmolded housing which accommodates and holds the plurality of molded housings. The plurality of molded housings are molded in a structure integrated by carrier portions that connect the adjacent molded housings to each other and are collectively integrated into the overmolded housing. The carrier portions have cross-section dimensions set to be smaller than those of the molded housing and have flexibility. An arrangement pitch between the adjacent molded housings are adjusted when the plurality of molded housings are collectively integrated into the overmolded housing.

6 Claims, 7 Drawing Sheets

(51) Int. Cl.
- *H01R 13/405* (2006.01)
- *H01R 13/514* (2006.01)
- *H01R 43/18* (2006.01)
- *H01R 43/24* (2006.01)
- *B29C 45/14* (2006.01)
- *B29C 45/16* (2006.01)
- *B29C 45/27* (2006.01)
- *B29C 45/00* (2006.01)

(52) U.S. Cl.
CPC ............ H01R13/405 (2013.01); H01R 13/514 (2013.01); H01R 43/18 (2013.01); H01R 43/24 (2013.01); *B29C 45/0046* (2013.01); *B29C 45/1671* (2013.01); *B29C 45/2708* (2013.01)

(56) References Cited

U.S. PATENT DOCUMENTS

| | | | | |
|---|---|---|---|---|
| 6,966,800 B2 * | 11/2005 | Mott | ................ | B29C 45/14311 439/722 |
| 8,011,976 B2 * | 9/2011 | Ooki | ................ | H01R 13/50 439/736 |
| 8,545,265 B2 * | 10/2013 | Sakamoto | ................ | B29C 45/14 439/606 |
| 8,740,655 B2 * | 6/2014 | Kato | ................ | H01R 43/24 439/606 |
| 9,033,734 B2 * | 5/2015 | Tanaka | ................ | H01R 9/032 439/587 |
| 2001/0003688 A1 | 6/2001 | Kondo | | |
| 2006/0186522 A1 | 8/2006 | Oohashi et al. | | |

OTHER PUBLICATIONS

Written Opinion dated Mar. 27, 2013 issued in International Application No. PCT/JP2012/084282 (PCT/ISA/237).

Office Action dated Sep. 8, 2015 issued by the Japanese Patent Office in counterpart Japanese Patent Application No. 2011-286391.

Communication from the State Intellectual Property Office of P.R. China dated Oct. 10, 2015 in a counterpart Chinese application No. 201280065317.2.

Communication from the European Patent Office issued Dec. 2, 2015 in a counterpart European Application No. 12821193.5.

* cited by examiner

CONNECTOR

CROSS REFERENCE TO RELATED APPLICATIONS

This application is a continuation of PCT application No. PCT/JP2012/084282, which was filed on Dec. 26, 2012 based on Japanese Patent Application No. 2011-286391, filed on Dec. 27, 2011, the contents of which are incorporated herein by reference.

BACKGROUND OF THE INVENTION

1. Field of the Invention

The present invention relates to a connector having a structure in which a plurality of molded housings molded to connection parts of electric wires and metal terminal fittings are accommodated and held in an overmolded housing.

2. Description of the Related Art

FIG. 7 illustrates a connector disclosed in PTL 1 below.

The connector 100 includes a metal terminal fitting 120 connected to the terminal of an electric wire 110, a molded housing 140 which is molded to a connection part 130 between the electric wire 110 and the metal terminal fitting 120 to cover the connection part 130, and an overmolded housing 150 which accommodates and holds the molded housing 140. A seal ring 180 is fitted to the outer periphery of the intermediate part of the overmolded housing 150.

The metal terminal fitting 120 includes a tab portion 121 connected to a female terminal 210 in a mating connector 200, and an electric wire crimping portion 122 which is provided at the base end of the tab portion 121 and to which the terminal of the electric wire 110 is crimp connected.

The connection part 130 between the electric wire 110 and the metal terminal fitting 120 described above means a range from the end portion of a coating portion 111 of the electric wire 110 that approaches the electric wire crimping portion 122 to a root portion 121a of the tab portion 121.

The molded housing 140 is mounted to the metal terminal fitting 120 so as to watertightly cover the outer periphery of the connection part 130.

In the connector 100 of PTL 1, a bracket 160 is fixed to the overmolded housing 150. The bracket 160 is fixed to a case 230 with a bolt 170 through a mounting hole 162 when the connector 100 is fitted into a hood portion 220 of the mating connector 200.

CITATION LIST

Patent Literature

[PTL 1] Japanese Patent Publication No. JP-A-2002-208456

SUMMARY OF THE INVENTION

In a case where a multi-pole connector is to be made in the configuration of the connector 100 in PTL 1, the molded housings 140 of a plurality of the connectors 100 need to be integrally connected. In this case, a plurality of the molded housings 140, accommodated and held in the overmolded housing 150, are molded in a structure integrated by a carrier portion that connects the adjacent molded housings 140 to each other, and may be collectively integrated into a mold of the overmolded housing 150.

However, in this configuration, the plate thickness of the carrier portion that joins the plurality of the molded housings 140 to one another is increased, and thus variations in the arrangement pitch between the adjacent molded housings 140 are likely to occur due to the effects of shrinkage and warpage that occur in the carrier portion during molding. Moreover, since the carrier portion has a large plate thickness and thus has high rigidity, in the case where variations in the arrangement pitch between the adjacent molded housings 140 occur, it is difficult to correct the variations, and there is a concern that assembly characteristics of the overmolded housing 150 to the mold may be degraded or a reduction in the yield may be caused during molding of the molded housing 140.

Here, in order to solve these problems, an object of the present invention is to provide a connector having a structure in which a plurality of molded housings molded to connection parts of electric wires and metal terminal fittings are accommodated and held in an overmolded housing, the connector being capable of enhancing assembly characteristics of the plurality of molded housings to a mold of the overmolded housing, preventing a reduction in yield during molding of the molded housings, and enhancing the moldability of the overmolded housing in a case where the overmolded housing is formed by molding.

In order to achieve the object described above, a connector according to the invention is characterized by the following (1) to (3).

(1) A connector comprising:

a plurality of metal terminal fittings connected to terminals of electric wires;

a plurality of molded housings molded to connection parts of the electric wires and the metal terminal fittings to cover the connection parts; and an overmolded housing which accommodates and holds the plurality of molded housings, wherein the plurality of molded housings are molded in a structure integrated by carrier portions that connect the adjacent molded housings to each other and are collectively integrated into the overmolded housing, the carrier portions have cross-section dimensions set to be smaller than those of the molded housing and have flexibility, and an arrangement pitch between the adjacent molded housings are adjusted when the plurality of molded housings are collectively integrated into the overmolded housing.

(2) The connector according to the above (1), wherein dimensions of the carrier portions in a direction orthogonal to a direction in which the molded housings are lined up are set to dimensions that are at least ½ or less of dimensions of the molded housing in the same direction.

(3) The connector according to the above (1) or (2), wherein, as the molded housings, first molded housings molded into a predetermined shape by first housing cavities into which a resin material is directly injected from a resin injection gate of a mold and second molded housings molded into a predetermined shape by second housing cavities which are disposed adjacent to the first housing cavities are included, the plurality of molded housings collectively integrated into the overmolded housing are integrally formed in an arrangement structure in which the first molded housings are disposed on both outer sides of the two adjacent second molded housings, as the carrier portions, first carrier portions which are molded by first carrier cavities that cause the first housing cavities and the second housing cavities to communicate with each other so as to cause the resin material injected into the first housing cavities to flow into the second housing cavities, thereby connecting the first molded housings and the second molded housings, and second carrier portions which are molded by second carrier cavities that cause the adjacent second housing cavities to communicate with each other, thereby connecting the adjacent second housing cavities, are included, and a cross-sectional area of each of the second carrier portions is set to be smaller than a cross-sectional area of each of the first carrier portions.

According to the configuration of (1), since the plurality of molded housings assembled to the mold of the overmolded housing are formed in the integrated structure in which the adjacent molded housings are connected by the carrier portions, the plurality of molded housings may be assembled collectively to the mold of the overmolded housing.

Moreover, the carrier portion has cross-section dimensions set to be smaller than those of the molded housing so as to be provided with flexibility that adjusts the arrangement pitch between the adjacent molded housings. Therefore, even though variations in the arrangement pitch between the adjacent molded housings occur due to the effects of shrinkage and warpage that occur in the carrier portions during molding, the variations in the arrangement pitch may be corrected by bending deformation of the carrier portions.

Therefore, degradation in assembly characteristics to the mold of the overmolded housing due to the variations in the arrangement pitch between the molded housings is prevented, thereby enhancing assembly characteristics of the plurality of molded housings to the mold of the overmolded housing.

In addition, even though variations in the arrangement pitch between the adjacent molded housings occur due to the effects of shrinkage and warpage that occur in the carrier portions during molding, the variations in the arrangement pitch may be corrected by bending deformation of the carrier portions. Therefore, the generation of molding defects is reduced, and thus a reduction in the yield during molding of the molded housings may be prevented.

Moreover, in the case where the plurality of molded housings are formed in the structure integrated by the carrier portions and the overmolded housing is formed by molding, the plurality of molded housings may be mounted to the mold of the overmolded housing by a single operation, thereby enhancing the moldability of the overmolded housing.

In addition, according to the configuration of (2), since the dimensions of the carrier portions in the direction orthogonal to the direction in which the molded housings are lined up are significantly smaller than the dimensions of the molded housing in the same direction, ensuring flexibility in the direction orthogonal to the direction in which the molded housings are lined up is facilitated. Therefore, even though variations in the arrangement pitch between the adjacent molded housings occur due to the effects of shrinkage and warpage that occur in the carrier portions during molding, it is possible to correct the variations in the arrangement pitch by bending deformation of the carrier portions.

According to the configuration of (3), the mold to which the plurality of molded housings are collectively molded has a structure in which the single resin injection gate is disposed with respect to three adjacent housing cavities. Therefore, the number of resin injection gates provided is reduced, and thus the structure of the mold may be simplified.

In addition, the two kinds of carrier portions including the first carrier portions and the second carrier portions are provided as the carrier portions that connect the adjacent molded housings, and the cross-sectional area of the second carrier portion at a position separated to be far from the resin injection gate is set to be smaller than the cross-sectional area of the first carrier portion at a position close to the resin injection gate. Therefore, the resin material used for the carrier portions may be reduced without degrading the fluidity of the resin material during molding.

According to the connector according to the present invention, since the plurality of molded housings integrated into the overmolded housing are formed in the integrated structure in which the adjacent molded housings are connected by the carrier portions, the plurality of molded housings may be assembled collectively to the mold of the overmolded housing.

Moreover, in the carrier portions, even though variations in the arrangement pitch between the adjacent molded housings occur due to the effects of shrinkage and warpage that occur in the carrier portions during molding, the variations in the arrangement pitch may be corrected by bending deformation of the carrier portions.

Therefore, degradation in assembly to the mold of the overmolded housing due to the variations in the arrangement pitch between the molded housings is prevented, thereby enhancing assembly characteristics of the plurality of molded housings to the mold of the overmolded housing.

In addition, even though variations in the arrangement pitch between the adjacent molded housings occur due to the effects of shrinkage and warpage that occur in the carrier portions during molding, the variations in the arrangement pitch may be corrected by bending deformation of the carrier portions. Therefore, the generation of molding defects is reduced, and thus a reduction in the yield during molding of the molded housings may be prevented.

Moreover, in the case where the plurality of molded housings are formed in the structure integrated by the carrier portions and the overmolded housing is formed by molding, the plurality of molded housings may be mounted to the mold of the overmolded housing by a single operation, thereby enhancing the moldability of the overmolded housing.

DETAILED DESCRIPTION OF THE EXEMPLARY EMBODIMENTS

Hereinafter, exemplary embodiments of a connector according to the present invention will be described in detail with reference to the drawings.

Figure 1:
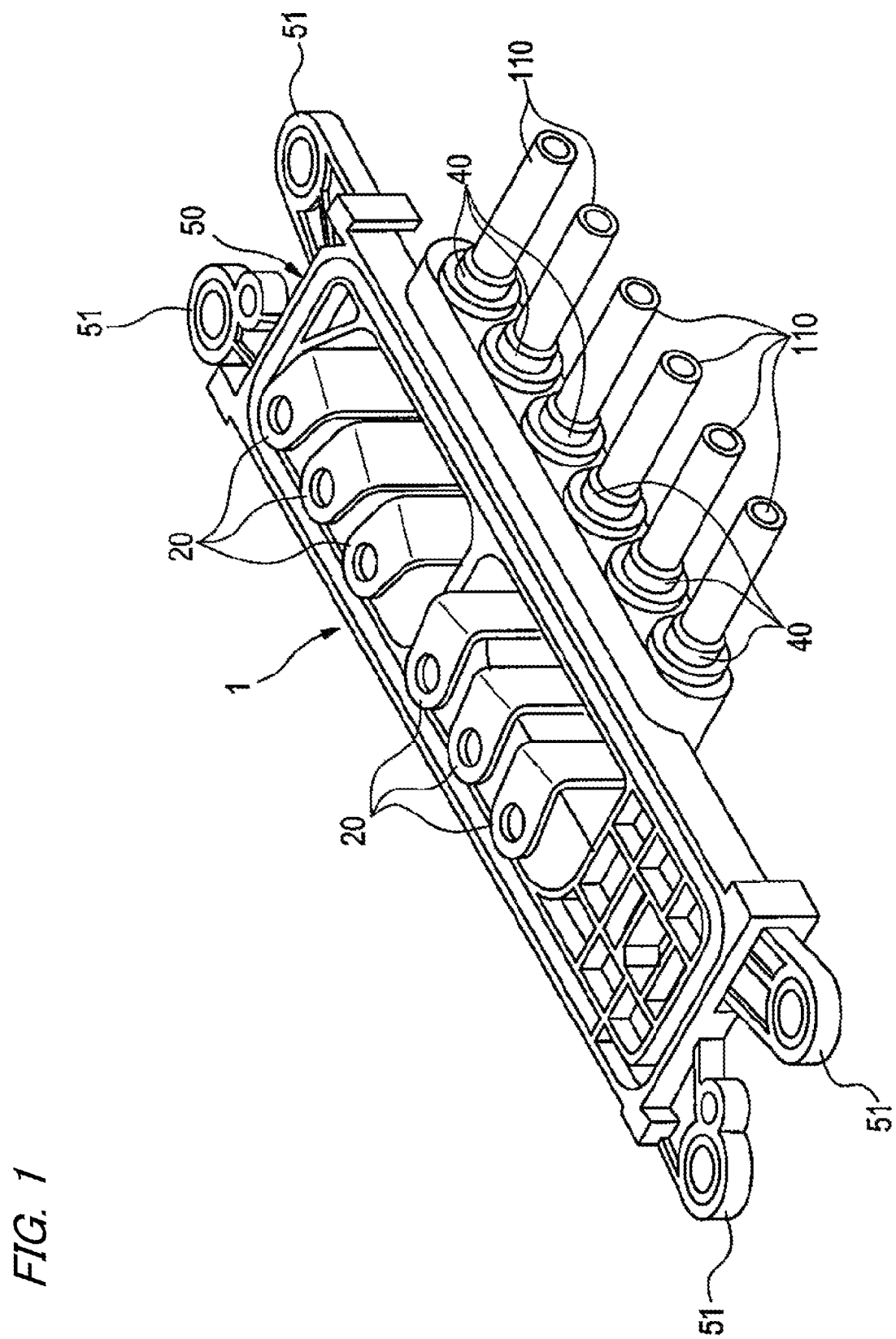
FIG. 1 is a perspective view of an assembled state of a connector according to an embodiment of the present invention.
Figure 2:
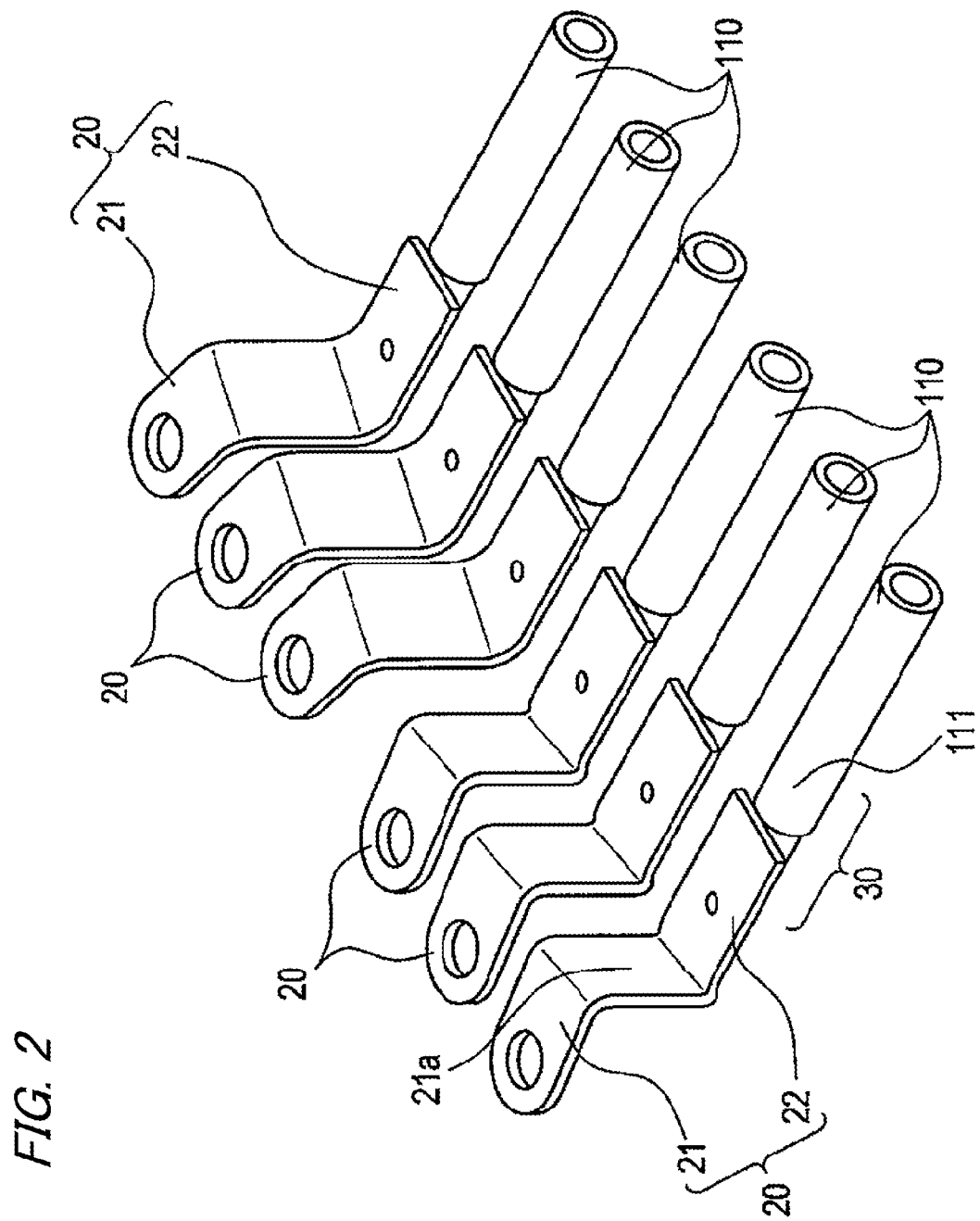
FIG. 2 is a perspective view of a plurality of metal terminal fittings accommodated at predetermined pitches in the connector of FIG. 1.
Figure 3:
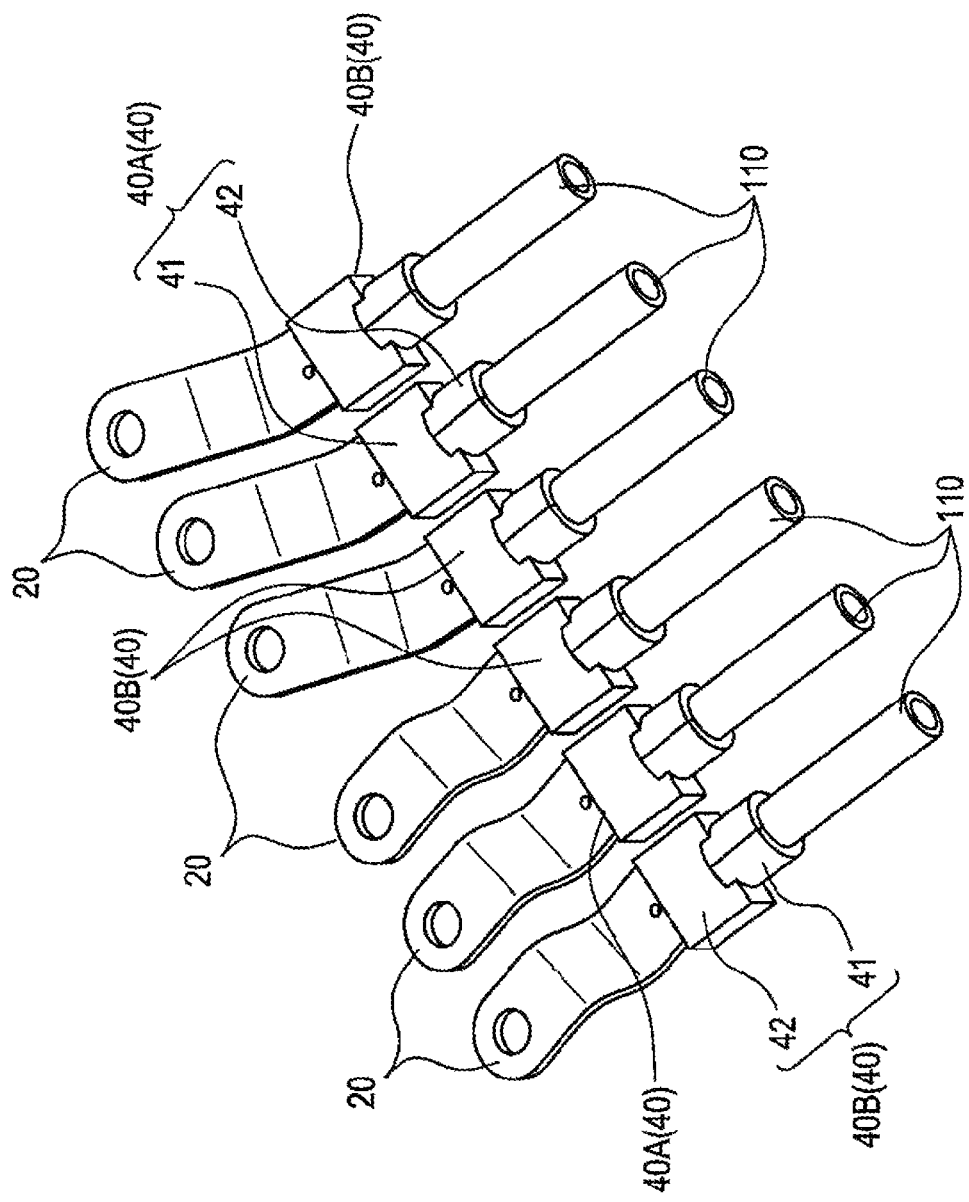
FIG. 3 is a perspective view of a state in which the plurality of metal terminal fittings illustrated in FIG. 2 are integrated by molding molded housings and carrier portions.
Figure 4:
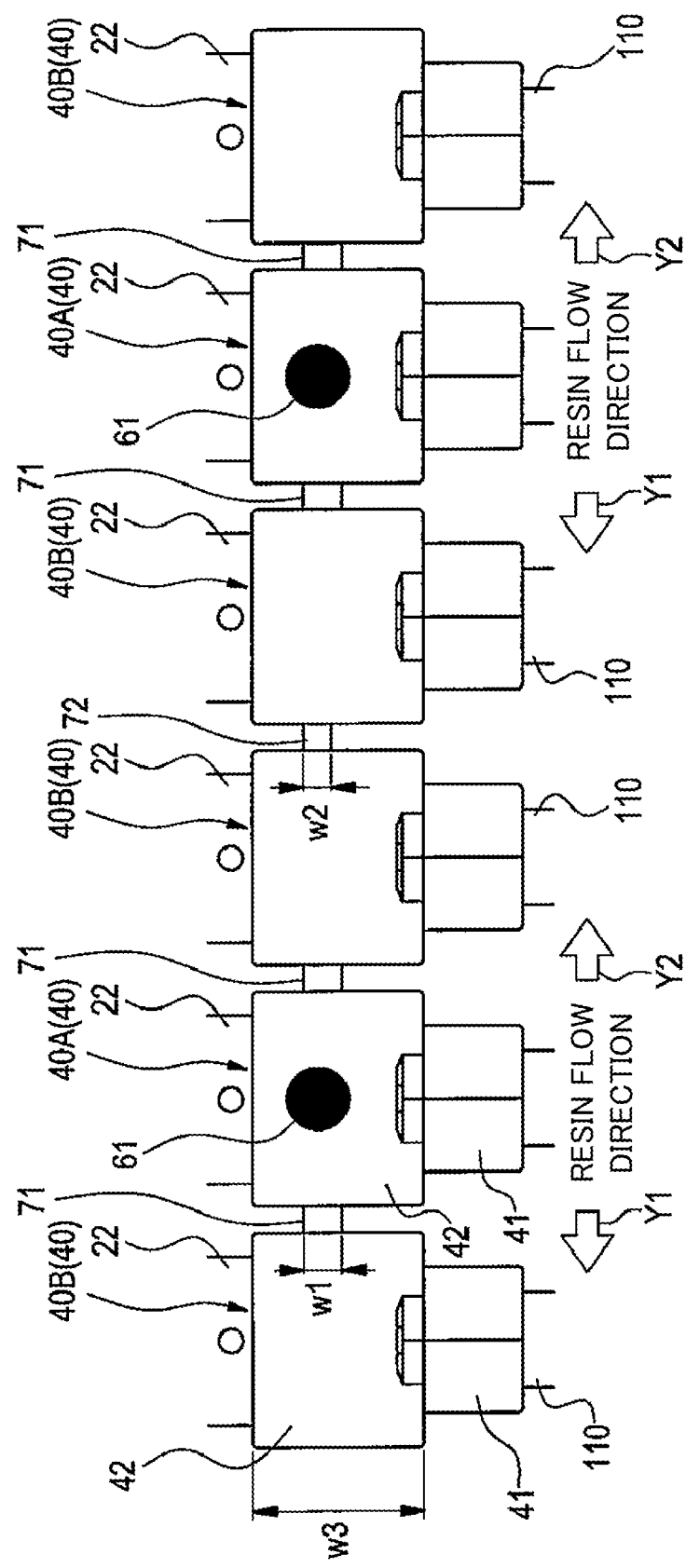
FIG. 4 is an enlarged plan view illustrating a state in which a plurality of the molded housings illustrated in FIG. 3 are integrated by the carrier portions.

FIGS. 1 to 4 illustrate an embodiment of the connector according to the present invention. FIG. 1 is a perspective view of an assembled state of the connector of the embodiment of the present invention. FIG. 2 is a perspective view of a plurality of metal terminal fittings accommodated at predetermined pitches in the connector of FIG. 1. FIG. 3 is a perspective view of a state in which the plurality of metal terminal fittings illustrated in FIG. 2 are integrated by molding molded housings and carrier portions. FIG. 4 is an enlarged plan view illustrating a state in which a plurality of the molded housings illustrated in FIG. 3 are integrated by the carrier portions.

The connector 1 of the embodiment includes a plurality of electric wires 110 having insulation coatings on the outer peripheries, a plurality of the metal terminal fittings 20 respectively connected to the terminals of the electric wires 110, a plurality of the molded housings 40, and an overmolded housing 50 to which the plurality of the molded housings 40 are assembled.

As illustrated in FIG. 2, the metal terminal fitting 20 includes a tongue-shaped plate portion 21 fastened to a terminal connection portion in a mating connector (not shown) and an electric wire connection portion 22 which is provided at the base end of the tongue-shaped plate portion 21 and to which the terminal of the electric wire 110 is electrically connected.

The molded housing 40 is molded to a connection part 30 (see FIG. 2) in the electric wire 110 and the metal terminal fitting 20 to cover the connection part 30. As illustrated in FIG. 2, the connection part 30 means a range from the end portion of the coating portion 111 of the electric wire 110 that approaches the electric wire connection portion 22 to the vicinity of the tip end of the electric wire connection portion 22 (the vicinity of a root portion 21a of the tongue-shaped plate portion 21).

In the case of this embodiment, as illustrated in FIG. 4, as the molded housings 40, two kinds of molded housings including first molded housings 40A and second molded housings 40B are arranged.

The first molded housing 40A is a molded housing which is molded into a predetermined shape by a first housing cavity into which a resin material is directly injected from a resin injection gate 61 of a mold. The second molded housing 40B is a molded housing which is molded into a predetermined shape by a second housing cavity which is disposed adjacent to the first housing cavity in the mold. In the second housing cavity, the resin injection gate 61 is not provided, and the resin material injected into the first housing cavity flows into the second housing cavity through a first carrier cavity described later, thereby achieving filling of the resin material.

As illustrated in FIG. 4, the plurality of the molded housings 40 integrated into the overmolded housing 50 are integrally formed in an arrangement structure in which the first molded housings 40A are disposed on both outer sides of the two adjacent second molded housings 40B.

In the case of this embodiment, as illustrated in FIG. 3, each of the first molded housings 40A and the second molded housings 40B includes a first molded portion 41 which is cylindrical and covers the end portion of the coating portion 111 and a second molded portion 42 which has a rectangular parallelepiped shape and is formed to be connected to the tip end side of the first molded portion 41 to cover the tip end side of the electric wire connection portion 22.

In the case of this embodiment, as illustrated in FIG. 4, the plurality of the molded housings 40 are molded in a structure integrated by two kinds of carrier portions including first carrier portions 71 and second carrier portions 72 and are assembled collectively to the overmolded housing 50. Here, the first carrier portion 71 is a carrier portion which connects the first molded housing 40A and the second molded housing 40B which are adjacent to each other. In addition, the second carrier portion 72 is a carrier portion which connects the adjacent second molded housings 40B.

The first carrier portion 71 is molded by the first carrier cavity which causes the first housing cavity and the second housing cavity to communicate with each other so that the resin material injected into the first housing cavity flows into the second housing cavity in the mold (not shown).

The second carrier portion 72 is molded by a second carrier cavity which causes the adjacent second housing cavities to communicate with each other in the mold (not shown).

In FIG. 4, arrows Y1 and Y2 represent a resin flow direction when the resin material injected into the first housing cavity flows to the second housing cavity.

In the case of this embodiment, each of the two kinds of carrier portions 71 and 72 has cross-section dimensions set to be smaller than those of the molded housing 40, so as to be provided with flexibility that adjusts the arrangement pitch between the adjacent molded housings 40.

As a method of reducing the cross-section dimensions of the two kinds of carrier portions 71 and 72 to be smaller than those of the molded housing 40, in this embodiment, as illustrated in FIG. 4, dimensions w1 and w2 of the carrier portions 71 and 72 in a direction orthogonal to a direction in which the molded housings 40 are lined up are set to dimensions that are at least ½ or less of dimensions w3 of the second molded portion 42 in the same direction in the molded housing 40.

In addition, the dimensions (height dimensions) of each of the two kinds of carrier portions 71 and 72 in a direction orthogonal to the paper surface of FIG. 4, are also set to be smaller than the height dimensions of the molded housing 40.

Moreover, in the case of this embodiment, the cross-sectional area of the second carrier portion 72 is set to be smaller than the cross-sectional of the first carrier portion 71.

In order to cause the cross-sectional area of the second carrier portion 72 to be smaller than the cross-sectional area of the first carrier portion 71, as illustrated in FIG. 4, the dimensions w2 in the second carrier portion 72 are set to be smaller than the dimensions w1 in the first carrier portion 71. Accordingly, the second carrier portion 72 is thinner than the first carrier portion 71 and has a cross-sectional area smaller than that of the first carrier portion 71.

As illustrated in FIG. 1, the overmolded housing 50 which accommodates and holds the plurality of the molded housings 40 has a connection portion 51 for connection to the mating connector (not shown).

The overmolded housing 50 in this embodiment is molded to the plurality of molded housings 40 molded in the structure integrated by the two kinds of carrier portions 71 and 72, thereby being integrated with the plurality of the molded housings 40.

Figure 5:
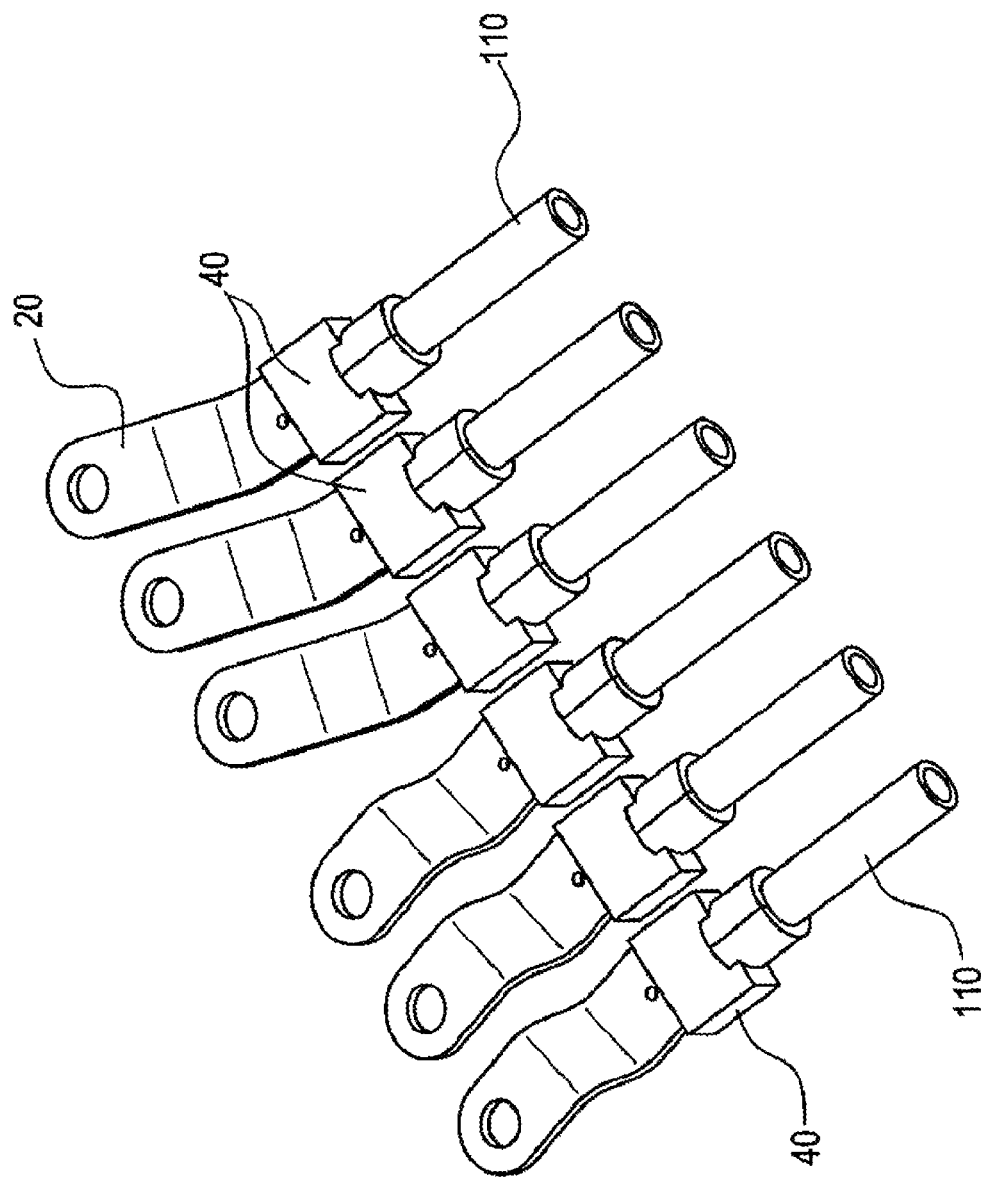
FIG. 5 is a perspective view illustrating a reference example of a structure in which a plurality of molded housings respectively provided to metal terminal fittings are independent from each other without having carrier portions that connect the adjacent molded housings.

In the case of the connector 1 of this embodiment described above, since the plurality of the molded housings 40 integrated into the overmolded housing 50 is formed in the integrated structure in which the adjacent molded housings 40 are connected to each other by the carrier portions 71 and 72, in comparison to a case where the molded housings 40 are formed in a structure in which they are independent from each other without having the carrier portions 71 and 72 described above as illustrated in FIG. 5, an operation of assembling the individual molded housings 40 to the mold of the overmolded housing 50 does not need to be repeated, and the molded housings 40 may be assembled collectively to the mold of the overmolded housing 50, thereby facilitating assembly to the mold of the overmolded housing 50.

Moreover, the carrier portions 71 and 72 have cross-section dimensions set to be smaller than those of the molded housing 40 so as to be provided with flexibility that adjusts the arrangement pitch between the adjacent molded housings 40.

Figure 6:
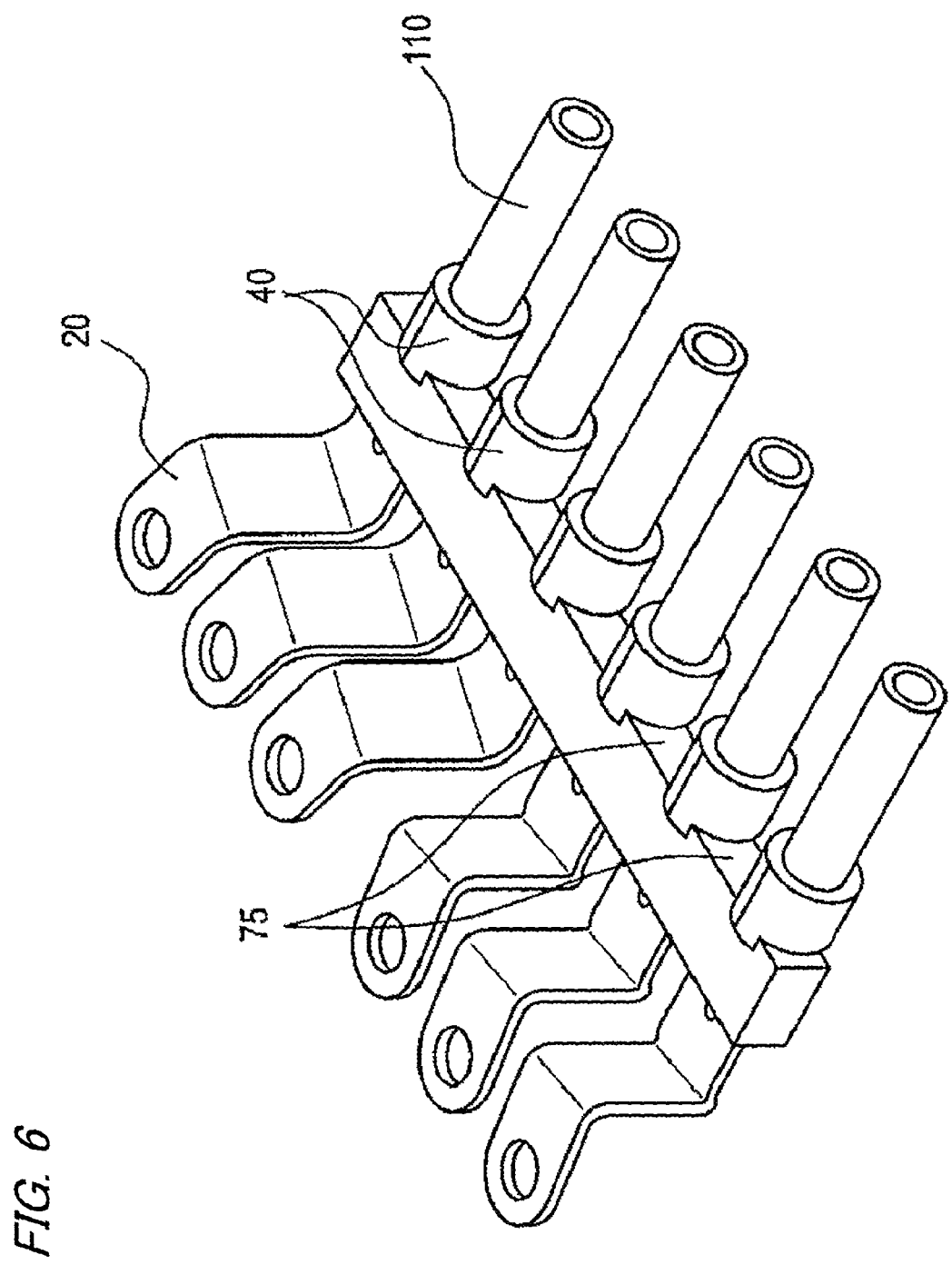
FIG. 6 is a perspective view illustrating a reference example of a structure in which a plurality of molded housings respectively provided to metal terminal fittings are integrated by a carrier portion having a highly rigid block structure.
Figure 7:
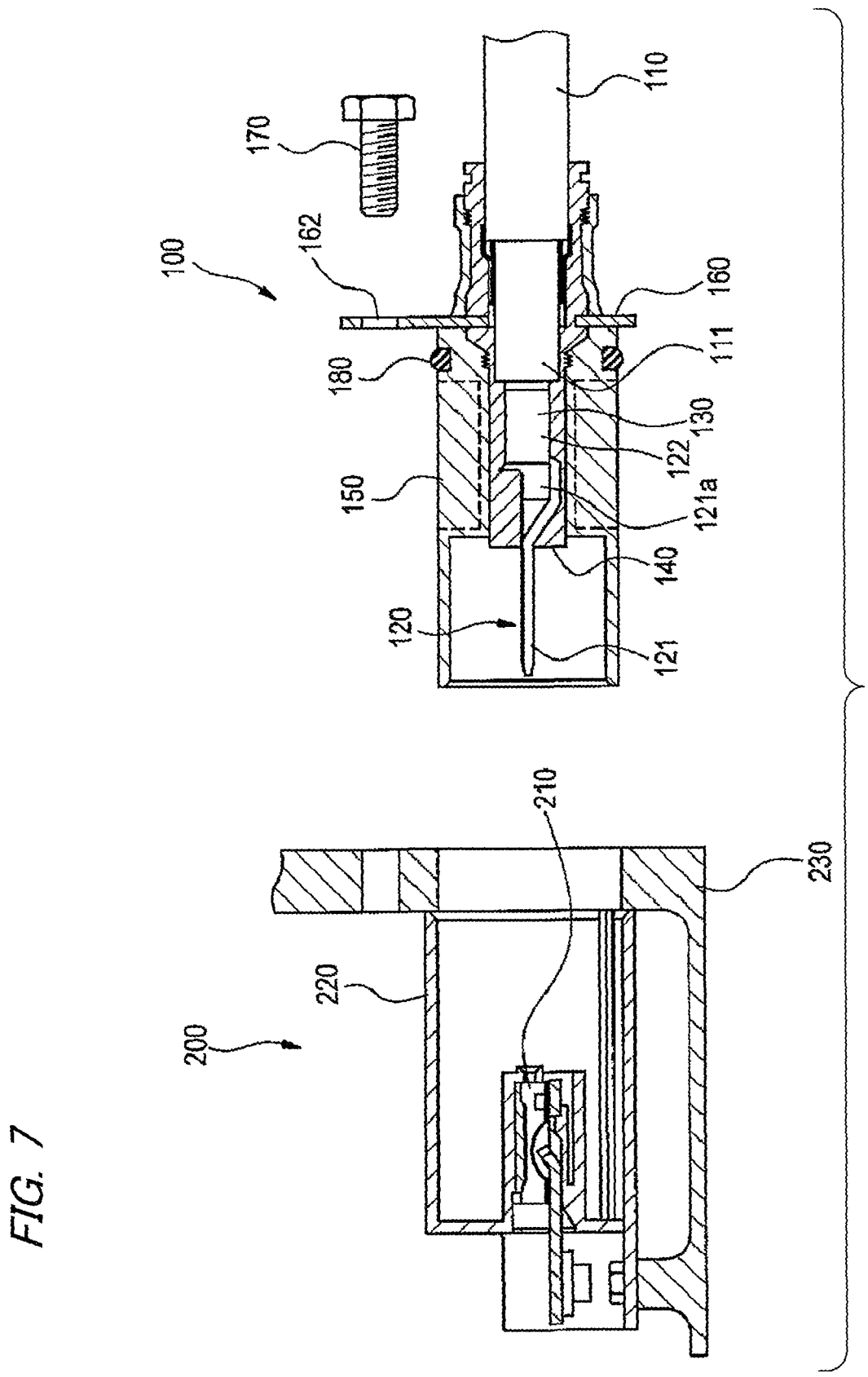
FIG. 7 is a longitudinal cross-sectional view of a connector according to the related art.

Therefore, in comparison to a case where the adjacent molded housings 40 are joined by a carrier portion 75 having large cross-section dimensions in a rigid structure as illustrated in FIG. 6, even though variations in the arrangement pitch between the adjacent molded housings 40 occur due to the effects of shrinkage and warpage that occur in the carrier portions 71 and 72 during molding, the variations in the arrangement pitch may be corrected by bending deformation of the carrier portions 71 and 72.

Therefore, degradation in assembly to the mold of the overmolded housing 50 due to the variations in the arrangement pitch between the molded housings 40 is prevented, thereby enhancing assembly characteristics of the plurality of the molded housings 40 to the mold of the overmolded housing 50.

In addition, even though variations in the arrangement pitch between the adjacent molded housings 40 occur due to the effects of shrinkage and warpage that occur in the carrier portions 71 and 72 during molding, the variations in the arrangement pitch may be corrected by bending deformation of the carrier portions 71 and 72. Therefore, the generation of molding defects is reduced, and thus a reduction in the yield during molding of the molded housings 40 may be prevented.

Moreover, in the case where the plurality of the molded housings 40 are formed in the structure integrated by the carrier portions 71 and 72 and the overmolded housing 50 is formed by molding, the plurality of the molded housings 40 may be mounted to the mold of the overmolded housing 50 by a single operation, thereby enhancing the moldability of the overmolded housing 50.

In addition, according to the connector 1 of this embodiment, since the dimensions w1 and w2 of the carrier portions 71 and 72 in the direction orthogonal to the direction in which the molded housings 40 are lined up are significantly smaller than the dimensions w3 of the molded housing 40 in the same direction, ensuring flexibility in the direction orthogonal to the direction in which the molded housings 40 are lined up is facilitated. Therefore, even though variations in the arrangement pitch between the adjacent molded housings 40 occur due to the effects of shrinkage and warpage that occur in the carrier portions 71 and 72 during molding, it is possible to correct the variations in the arrangement pitch by bending deformation of the carrier portions 71 and 72.

In addition, according to the connector 1 of this embodiment, the mold to which the plurality of the molded housings 40 are collectively molded has a structure in which the single resin injection gate 61 is disposed with respect to three adjacent housing cavities. Therefore, the number of resin injection gates 61 provided is reduced, and thus the structure of the mold may be simplified.

In addition, the two kinds of carrier portions including the first carrier portions 71 and the second carrier portions 72 are provided as the carrier portions that connect the adjacent molded housings 40, and the cross-sectional area of the second carrier portion 72 at a position separated to be far from the resin injection gate 61 is set to be smaller than the cross-sectional area of the first carrier portion 71 at a position close to the resin injection gate 61. Therefore, the resin material used for the carrier portions 71 and 72 may be reduced without degrading the fluidity of the resin material during molding.

In addition, the connector of the present invention is not limited to each of the embodiments described above, and modifications and improvements thereof may be appropriately made.

For example, the mold to which the plurality of the molded housings are molded in the integrated structure may have a configuration in which the resin injection gate is provided to each of the housing cavities for molding the molded housings.

In addition, the cross-sectional area of the carrier portion that connects the adjacent molded housings is set to be as small as possible so as to achieve material reduction, providing there is no impairment of resin fluidity during molding, and that strength is ensured to a degree at which the carrier portions are prevented from being accidentally broken by an external force exerted during transit or the like.

The present invention is useful for providing a connector capable of enhancing assembly characteristics of a plurality of molded housings to a mold of an overmolded housing, preventing a reduction in yield during molding of the molded housings, and enhancing the moldability of the overmolded housing in a case where the overmolded housing is formed by molding.

What is claimed is:

1. An electrical connector comprising:
    a plurality of metal terminal fittings connected to electric wires;
    a plurality of molded housings molded to connection parts of the electric wires and the metal terminal fittings to cover the connection parts, the plurality of molded housings comprising:
        first molded housings molded into a predetermined shape, and
        second molded housings molded into a predetermined shape; and
    an overmolded housing which accommodates and holds the plurality of molded housings,
    wherein the plurality of molded housings are molded in a structure integrated by first and second carrier portions that connect the adjacent molded housings to each other and are collectively integrated into the overmolded housing,
    wherein the first and second carrier portions have cross-section dimensions set to be smaller than cross-section dimensions of the molded housing and have flexibility,
    wherein the first carrier portions have cross-section dimensions set to be different than cross-section dimensions of the second carrier portions,
    wherein the plurality of molded housings are integrally formed in an arrangement structure in which first molded housings are disposed on both outer sides of adjacent second molded housings, and
    wherein an arrangement pitch between the adjacent molded housings is adjusted when the plurality of molded housings are collectively integrated into the overmolded housing.

2. The connector according to claim 1,
    wherein cross-section dimensions of the first and second carrier portions in a direction orthogonal to a direction in which the molded housings are lined up are set to dimensions that are at least ½ or less of cross-section dimensions of the molded housings in the same direction.

3. The connector according to claim 1,
    wherein the first molded housings are molded into the predetermined shape by first housing cavities into which a resin material is directly injected from a resin injection gate of a mold and the second molded housings are molded into the predetermined shape by second housing cavities which are disposed adjacent to the first housing cavities, and wherein the first carrier portions are molded by first carrier cavities that cause the first housing cavities and the second housing cavities to communicate with each other so as to cause the resin material injected into the first housing cavities to flow into the second housing cavities, thereby connecting the first molded housings and the second molded housings, and the second carrier portions are molded by second carrier cavities that cause the adjacent second housing cavities to communicate with each other, thereby connecting the adjacent second housing cavities.

4. The connector according to claim 1, wherein a cross-sectional area of the second carrier portions is set to be smaller than a cross-sectional area of the first carrier portions.

5. An electrical connector comprising:

a plurality of metal terminal fittings connected to electric wires; and a plurality of molded housings molded to connection parts of the electric wires and the metal terminal fittings to cover the connection parts, wherein the plurality of molded housings comprises first molded housings molded into a predetermined shape and second molded housings molded into a predetermined shape;

wherein the plurality of molded housings are arranged such that at least one first molded housing is disposed on both outer sides of adjacent second molded housings, wherein first and second carrier portions connect adjacent molded housings to each other, wherein the first carrier portions connect the at least one first molded housing to an adjacent second molded housing of the pair of adjacent second molded housings, wherein the second carrier portions connect the pair of adjacent second molded housings, wherein the first carrier portions have cross-section dimensions set to be different than cross-section dimensions of the second carrier portions.

6. The connector according to claim 5, wherein a cross-sectional area of the second carrier portions is set to be smaller than a cross-sectional area of the first carrier portions.

\* \* \* \* \*